(12) United States Patent
Kwak et al.

(10) Patent No.: US 12,143,951 B2
(45) Date of Patent: Nov. 12, 2024

(54) MULTI-BANDWIDTH OPERATION FOR A WIRELESS COMMUNICATION SYSTEM

(71) Applicant: QUALCOMM Incorporated, San Diego, CA (US)

(72) Inventors: Yongjun Kwak, San Diego, CA (US); Tingfang Ji, San Diego, CA (US); Juan Montojo, San Diego, CA (US); Peter Gaal, San Diego, CA (US); Hwan Joon Kwon, San Diego, CA (US); Krishna Kiran Mukkavilli, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/449,449

(22) Filed: Sep. 29, 2021

(65) Prior Publication Data

US 2022/0104156 A1 Mar. 31, 2022

Related U.S. Application Data

(60) Provisional application No. 63/085,587, filed on Sep. 30, 2020.

(51) Int. Cl.
*H04W 56/00* (2009.01)
*H04L 27/26* (2006.01)
(Continued)

(52) U.S. Cl.
CPC ..... *H04W 56/001* (2013.01); *H04L 27/26025* (2021.01); *H04W 72/0453* (2013.01); *H04W 72/23* (2023.01); *H04W 74/0833* (2013.01)

(58) Field of Classification Search
None
See application file for complete search history.

(56) References Cited

U.S. PATENT DOCUMENTS

2018/0270771 A1* 9/2018 Chendamarai Kannan ................. H04L 27/2675
2019/0132793 A1* 5/2019 Lin .................. H04W 52/0206
(Continued)

FOREIGN PATENT DOCUMENTS

WO WO-2019224871 A1 11/2019

OTHER PUBLICATIONS

International Search Report and Written Opinion—PCT/US2021/071664—ISA/EPO—Apr. 28, 2022.
(Continued)

*Primary Examiner* — Faiyazkhan Ghafoerkhan
(74) *Attorney, Agent, or Firm* — Norton Rose Fulbright US LLP

(57) ABSTRACT

An apparatus for wireless communications includes a processor and a memory that includes instructions. The one or more processors are configured to execute the instructions to control reception, from a base station, of a first downlink signal using a first bandwidth amount that is based on a first frequency range associated with a particular signal transmitted by the base station. The one or more processors are further configured to execute the instructions to initiate transmission, to the base station, of a first uplink signal using a second bandwidth amount. The second bandwidth amount is less than the first bandwidth amount, and the second bandwidth amount is based on a second frequency range associated with an uplink channel.

20 Claims, 12 Drawing Sheets

(51) Int. Cl.
*H04W 72/0453* (2023.01)
*H04W 72/23* (2023.01)
*H04W 74/0833* (2024.01)

(56) References Cited

U.S. PATENT DOCUMENTS

| | | | |
|---|---|---|---|
| 2019/0357070 A1* | 11/2019 | Zhang | H04W 24/10 |
| 2021/0127367 A1* | 4/2021 | Yi | H04W 72/23 |
| 2021/0204231 A1* | 7/2021 | Harada | H04L 5/001 |
| 2021/0297951 A1* | 9/2021 | Lin | H04W 52/0225 |
| 2021/0298056 A1* | 9/2021 | Fu | H04W 72/0453 |
| 2022/0053442 A1* | 2/2022 | Luo | H04W 74/0833 |
| 2022/0104156 A1* | 3/2022 | Kwak | H04W 72/0453 |
| 2022/0150008 A1* | 5/2022 | Schober | H04W 72/02 |

OTHER PUBLICATIONS

Partial International Search Report—PCT/US2021/071664—ISA/EPO—Jan. 27, 2022.
Qualcomm Incorporated: "Considerations for Complexity Reduction of RedCap Devices", 3GPP Draft, 3GPP TSG-RAN WG1 Meeting #101, R1-2004493, 3rd Generation Partnership Project (3GPP), Mobile Competence Centre, 650, Route Des Lucioles, F-06921, Sophia-Antipolis Cedex, France, vol. RAN WG1. No. e-Meeting, May 25, 2020-Jun. 5, 2020, May 16, 2020 (May 16, 2020), XP051886222, 7 Pages, Retrieved from the Internet: URL: https://ftp.3gpp.org/tsg_ran/WG1_RL1/TSGR1_101-e/Docs/R1-2004493.zip, R1-2004493 Considerations for Complexity Reduction of RedCap Devices.docx [retrieved on May 16, 2020].

* cited by examiner

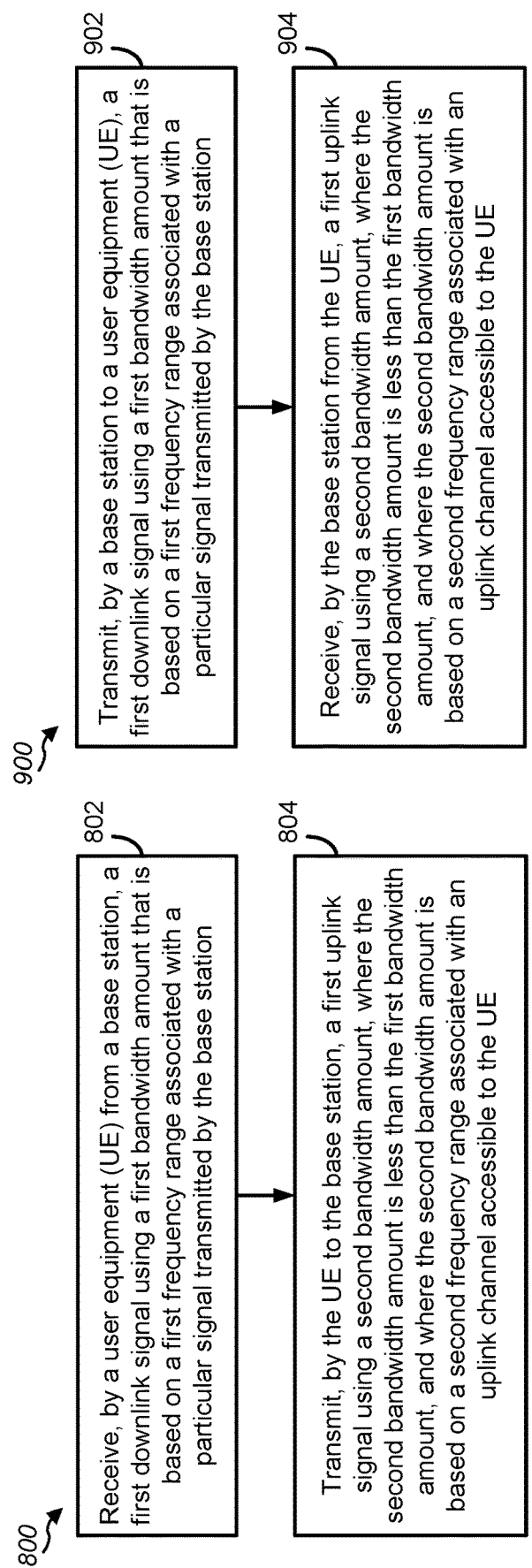

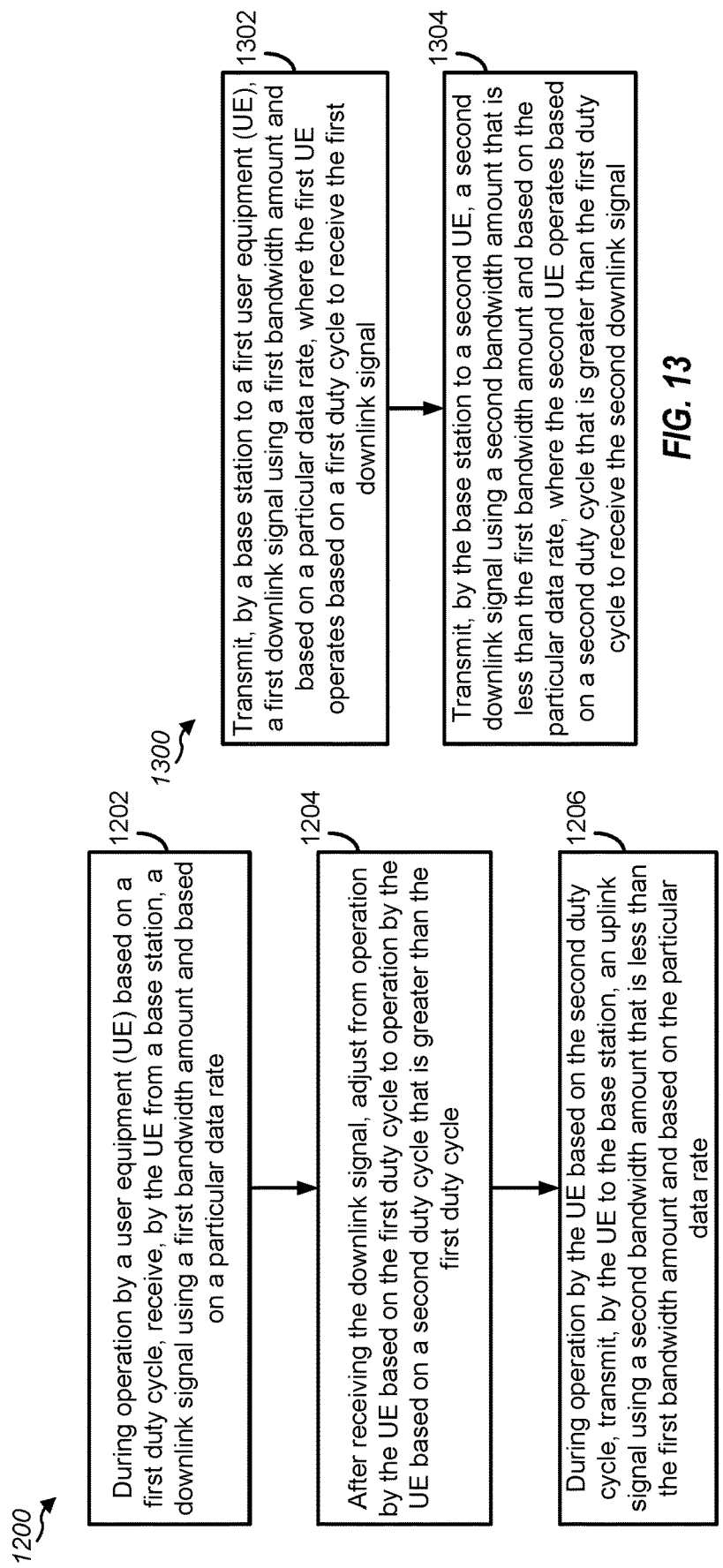

MULTI-BANDWIDTH OPERATION FOR A WIRELESS COMMUNICATION SYSTEM

CROSS-REFERENCE TO RELATED APPLICATIONS

This application claims the benefit of U.S. Prov. Pat. App. No. 63/085,587, entitled, "MULTI-BANDWIDTH OPERATION FOR A WIRELESS COMMUNICATION SYSTEM" and filed on Sep. 30, 2020, which is expressly incorporated by reference herein in its entirety.

TECHNICAL FIELD

Aspects of the present disclosure relate generally to wireless communication systems, and more particularly, to multi-bandwidth operation for a wireless communication system.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communications includes a processor and a memory that includes instructions. The one or more processors are configured to execute the instructions to control reception, from a base station, of a first downlink signal using a first bandwidth amount that is based on a first frequency range associated with a particular signal transmitted by the base station. The one or more processors are further configured to execute the instructions to initiate transmission, to the base station, of a first uplink signal using a second bandwidth amount. The second bandwidth amount is less than the first bandwidth amount, and the second bandwidth amount is based on a second frequency range associated with an uplink channel.

In some other aspects, an apparatus for wireless communications includes a processor and a memory that includes instructions. The one or more processors are configured to execute the instructions to initiate transmission, to a user equipment (UE), of a first downlink signal using a first bandwidth amount that is based on a first frequency range associated with a particular signal. The one or more processors are further configured to execute the instructions to control reception, from the UE, of a first uplink signal using a second bandwidth amount. The second bandwidth amount is less than the first bandwidth amount, and the second bandwidth amount is based on a second frequency range associated with an uplink channel that is associated with the UE.

In some other aspects, an apparatus for wireless communication includes a processor and a memory that includes instructions. The one or more processors are configured to execute the instructions to control reception of a synchronization signal block (SSB) from a base station using a first downlink bandwidth amount. The one or more processors are further configured to execute the instructions to adjust, during a switching interval following reception of the SSB, from operation based on the first downlink bandwidth amount to operation based on a second downlink bandwidth amount that is less than the first downlink bandwidth amount. The one or more processors are further configured to execute the instructions to control reception, after the switching interval, of one or both of a downlink data signal or a downlink control signal from the base station. The downlink data signal and the downlink control signal are associated with the second downlink bandwidth amount.

In some other aspects, an apparatus for wireless communication includes a processor and a memory that includes instructions. The one or more processors are configured to execute the instructions to initiate transmission of an SSB using a first downlink bandwidth amount. The one or more processors are further configured to execute the instructions to initiate transmission to a UE, after a switching interval following transmission of the SSB, of one or both of a downlink data signal or a downlink control signal that are associated with a second downlink bandwidth amount that is less than the first downlink bandwidth amount.

In some other aspects, a method of wireless communication includes receiving, by a UE from a base station, a first downlink signal using a first bandwidth amount that is based on a first frequency range associated with a particular signal transmitted by the base station. The method further includes transmitting, by the UE to the base station, a first uplink signal using a second bandwidth amount. The second bandwidth amount is less than the first bandwidth amount, and the second bandwidth amount is based on a second frequency range associated with an uplink channel accessible to the UE.

In some other aspects, a method of wireless communication includes transmitting, by a base station to a UE, a first downlink signal using a first bandwidth amount that is based on a first frequency range associated with a particular signal transmitted by the base station. The method further includes receiving, by the base station from the UE, a first uplink signal using a second bandwidth amount. The second bandwidth amount is less than the first bandwidth amount, and the second bandwidth amount is based on a second frequency range associated with an uplink channel accessible to the UE.

In some other aspects of the disclosure, a method of wireless communication includes receiving, by a UE, an SSB from a base station using a first downlink bandwidth amount during an SSB-based measurement timing configuration (SMTC) window. The method further includes, during a switching interval following the SMTC window, adjusting from operation of the UE based on the first downlink bandwidth amount to operation of the UE based on a second downlink bandwidth amount that is less than the first downlink bandwidth amount. The method further includes, after the switching interval, receiving, by the UE from the base station and using the second downlink bandwidth amount, one or both of a downlink data signal or a downlink control signal.

In some other aspects of the disclosure, a method of wireless communication includes transmitting, by a base station, an SSB using a first downlink bandwidth amount during an SMTC window. The method further includes, after a switching interval following the SMTC window, transmitting, to a UE, one or both of a downlink data signal or a downlink control signal using a second downlink bandwidth amount that is less than the first downlink bandwidth amount.

In some other aspects of the disclosure, a method of wireless communication includes, during operation by a UE based on a first duty cycle, receiving, by the UE from a base station, a downlink signal using a first bandwidth amount and based on a particular data rate. The method further includes, after receiving the downlink signal, adjusting from operation by the UE based on the first duty cycle to operation by the UE based on a second duty cycle that is greater than the first duty cycle. The method further includes, during operation by the UE based on the second duty cycle, transmitting, by the UE to the base station, an uplink signal using a second bandwidth amount that is less than the first bandwidth amount and based on the particular data rate.

In some other aspects of the disclosure, a method of wireless communication includes transmitting, by a base station to a first UE, a first downlink signal using a first bandwidth amount and based on a particular data rate. The first UE operates based on a first duty cycle to receive the first downlink signal. The method further includes transmitting, by the base station to a second UE, a second downlink signal using a second bandwidth amount that is less than the first bandwidth amount and based on the particular data rate. The second UE operates based on a second duty cycle that is greater than the first duty cycle to receive the second downlink signal.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 8 is a flow chart illustrating an example of a method of wireless communication according to some aspects of the disclosure.

FIG. 9 is a flow chart illustrating an example of a method of wireless communication according to some aspects of the disclosure.

FIG. 12 is a flow chart illustrating an example of a method of wireless communication according to some aspects of the disclosure.

FIG. 13 is a flow chart illustrating an example of a method of wireless communication according to some aspects of the disclosure.

DETAILED DESCRIPTION

Figure 1:
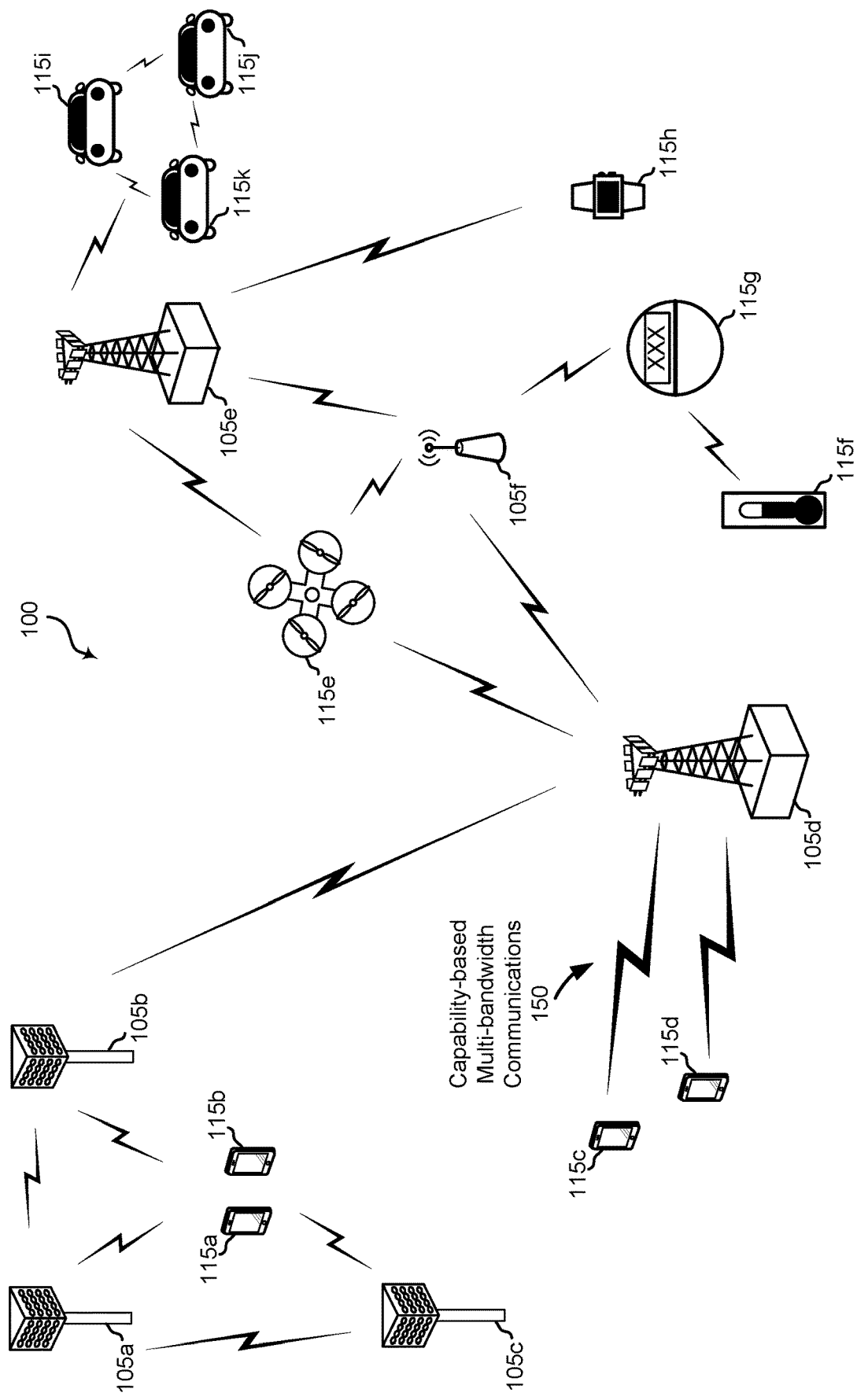
FIG. 1 is a block diagram illustrating an example of a wireless communication system according to some aspects of the disclosure.

Wireless communications systems increasingly provide premium services and other features. For example, cellular phones may provide broadband communications, low latency, high reliability, high throughput, and other services. As a result, wireless communication systems include features such as embedded mobile broadband (eMBB), ultra-reliable low-latency communication (URLLC), and vehicle-to-everything (V2X) communications.

In some applications, such features may increase overhead and complexity, which may decrease certain performance parameters or cost-efficiency. For example, metering devices may occasionally transmit measurements to a network device that contains a relatively small amount of data. If the network device supports low latency, high reliability, and high throughput, then transmission of the measurements may be associated with a relatively high power consumption of the metering devices, which may reduce battery life or increase operation complexity of the metering devices in some cases.

A wireless communication system in accordance with some aspects of the disclosure may use one or more multi-bandwidth schemes to improve performance for certain devices, such as a "lightweight" or "super lightweight" device. In a first example, a user equipment (UE) may be configured with asymmetric bandwidths for uplink and downlink communications. For example, a first bandwidth amount may be selected to enable the UE to receive a particular signal, such as a synchronization signal block (SSB) from a base station, which may occupy five physical resource blocks (PRBs) in some implementations. A second bandwidth amount may be selected based on one or more uplink channels accessible by the UE, such as a physical uplink control channel (PUCCH) or a physical uplink shared channel (PUSCH), which may have a frequency range (e.g., a minimum transmission size) of one PRB, or physical random access channel (PRACH), which may have a minimum transmission size of one PRB or six PRBs in some implementations.

In a second example alternatively or in addition to the first example, the UE may use a first downlink bandwidth for some operations and a second downlink bandwidth for some other operations. For example, the UE may receive an SSB during an SMTC window using a first downlink bandwidth and may receive other downlink communications (such as via a physical downlink control channel (PDCCH) or via a physical downlink shared channel (PDSCH)) using a second downlink bandwidth less than the first downlink bandwidth. Use of the first downlink bandwidth may enable the UE to receive the SSB (which may occupy twenty PRBs) while reducing overhead for other communications, such as PDCCH and PDSCH communications (which may have a minimum transmission size of one PRB or six PRBs).

In a third example alternatively or in addition to one or both of the first example and the second example, the UE may be configured with multiple duty cycles. For example, the UE may receive downlink signals using a first bandwidth and based on a first duty cycle and may transmit uplink signals using a second bandwidth less than the first bandwidth and based on a second duty cycle greater than the first duty cycle. As a result, the downlink and uplink communications may have a common data rate. Alternatively or in addition, a first UE may receive downlink signals using the first bandwidth and based on the first duty cycle, and a second UE receive downlink signals using the second bandwidth less than the first bandwidth and based on the second duty cycle greater than the first duty cycle. As a result, the communications by the first UE and the second UE may have a common data rate. Accordingly, a common data rate may be enabled for different bandwidths, which may avoid a circumstance in which a larger bandwidth amount is associated with a high data rate (which may increase power consumption and which may be unnecessary for certain light or superlight devices)

To further illustrate, aspects of the may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

In some aspects of the disclosure, one or more UEs 115 of FIG. 1 may perform capability-based multi-bandwidth communications 150. A particular UE 115 may perform the capability-based multi-bandwidth communications 150 based on a capability type of the particular UE 115, such as a reduced capability (RedCap) capability type, as an illustrative example. To further illustrate, in some examples, UE 115c may correspond to a RedCap UE and may perform the capability-based multi-bandwidth communications 150 with the base station 105d. In some examples, the UE 115d may be associated with another capability type, such as an eMBB capability type or a URLLC capability type. By performing the capability-based multi-bandwidth communications 150 using multiple bandwidths as described further below, the UE 115c may reduce power consumption as compared to the UE 115d in some cases. Alternatively or in addition, one or more other UEs 115 of FIG. 1 may perform the capability-based multi-bandwidth communications 150 (e.g., with the base station 105d or with another base station 105).

Figure 2:
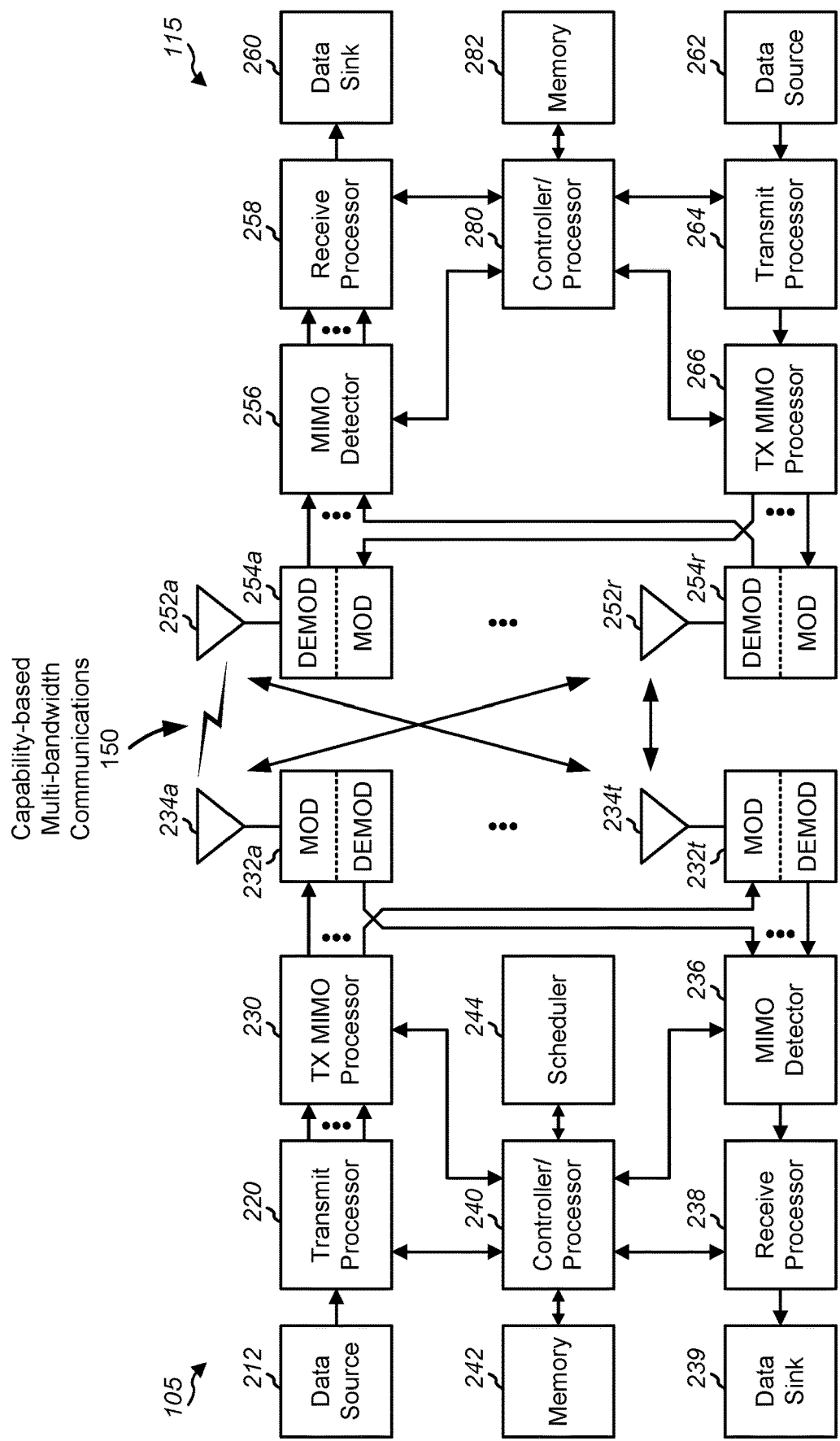
FIG. 2 is a block diagram illustrating examples of a base station and a UE according to some aspects of the disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of one or more operations illustrated in any of FIGS. 8-13, and/or other processes for the techniques described herein (such as performing the capability-based multi-bandwidth communications 150). The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
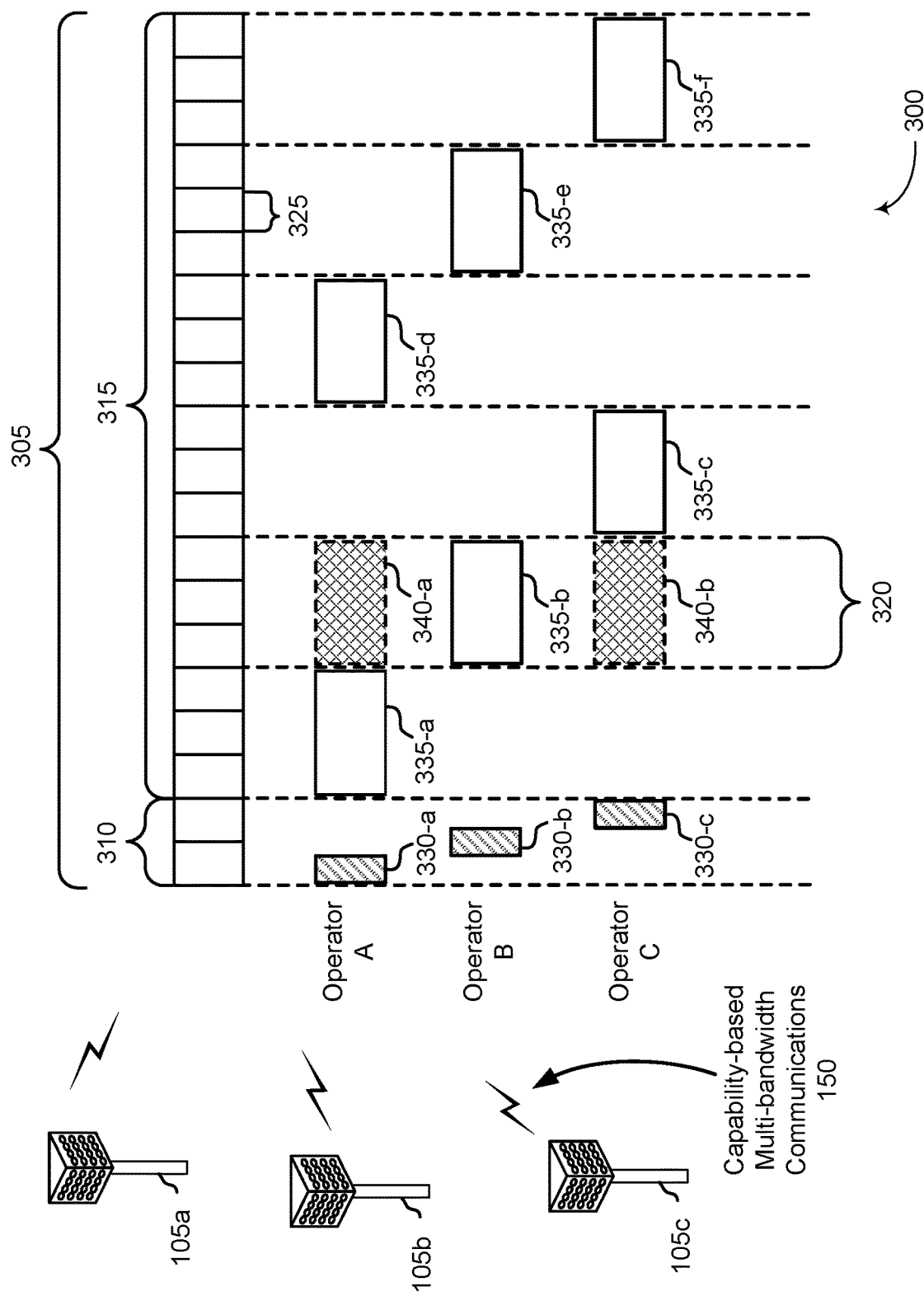
FIG. 3 is a block diagram illustrating an example of a wireless communication system including base stations that use directional wireless beams according to some aspects of the disclosure.

FIG. 3 illustrates an example of a timing diagram 300 for coordinated resource partitioning. In some implementations, operations described with reference to the timing diagram 300 may include or may enable the capability-based multi-bandwidth communications 150.

The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
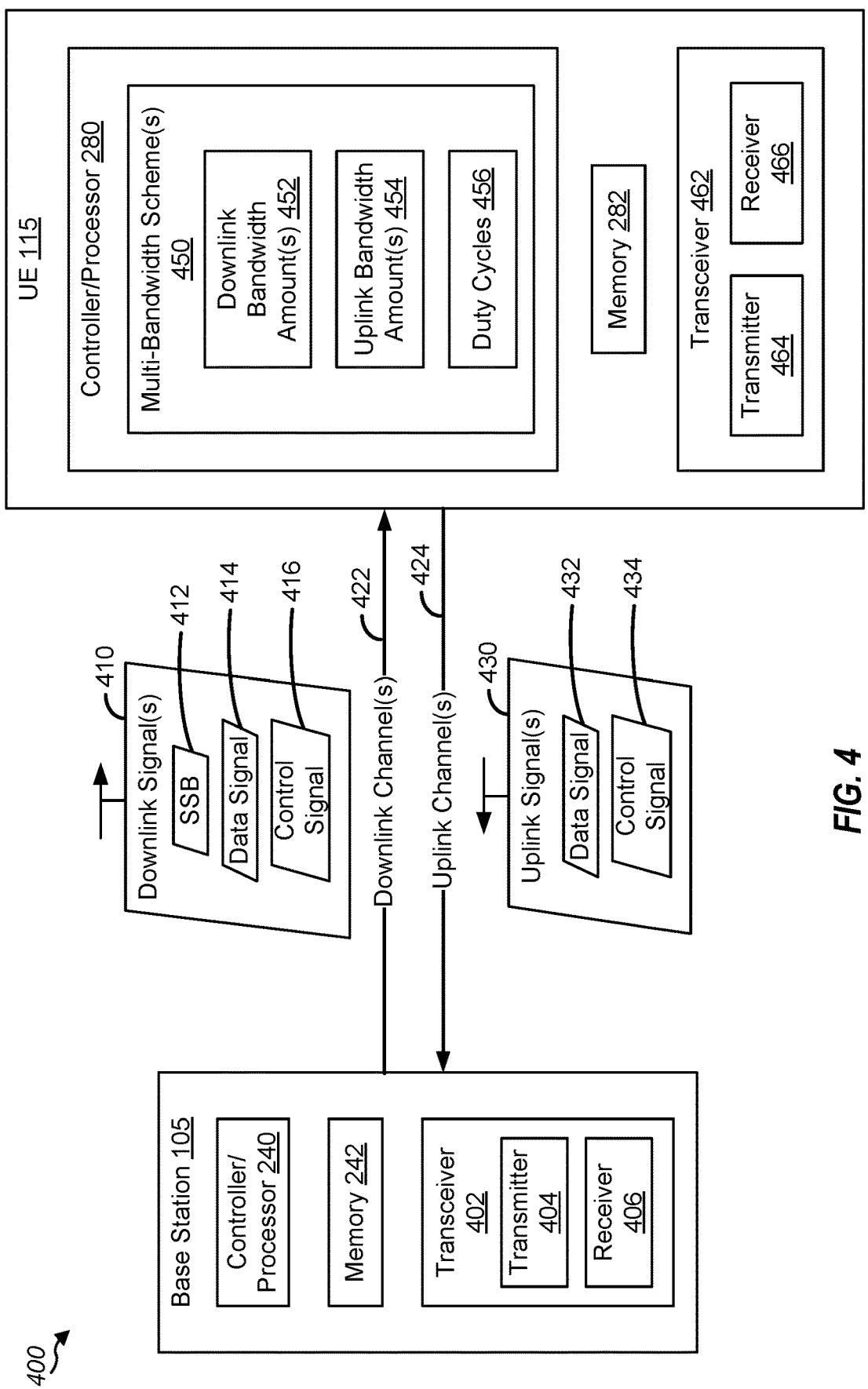
FIG. 4 is a block diagram illustrating an example of a wireless communications system that supports multi-bandwidth schemes according to some aspects of the disclosure.

FIG. 4 is a block diagram illustrating an example of a wireless communications system 400 that supports multi-bandwidth schemes 450 according to some aspects of the disclosure. The wireless communications system 400 may include one or more base stations, such as the base station 105. The wireless communications system 400 may include one or more UEs, such as the UE 115.

In some aspects, the wireless communications system 400 includes or corresponds to a low power wide area (LPWA) network. For example, the UE 115 may correspond to a reduced capability (RedCap) network that includes one or more UEs 115 having performance parameters (such as peak throughput, latency, and reliability) that are less than (or "relaxed") as compared to performance parameters of other devices, such as a device that supports eMBB or URLLC features. To further illustrate, in some examples, the UE 115 corresponds to "light" or "superlight" device that uses low-power or low-complexity operations, such as a metering device, an asset tracking device, or a personal IoT device.

In some examples, the wireless communications system 400 may also include one or more other UEs (in addition to the UE 115). In some examples, the UE 115 of FIG. 4 has a first capability type, and the one or more other UEs have at least a second capability type different than the first capability type. The first capability type may correspond to a reduced capability (RedCap) capability type, and the second capability type may correspond to an eMBB or URLLC capability type, as illustrative examples. In some implementations, support for the second capability type may be associated with a relatively high power consumption. For example, if the base station 105 supports one or more of low latency, high reliability, or high throughput, then operation of the UE 115 may be associated with relatively high power consumption. One or more aspects described herein may reduce power consumption of the UE 115 in some such examples.

The base station 105 may include the controller/processor 240, the memory 242, and a transceiver 402. In some examples, the transceiver 402 includes a transmitter 404 and a receiver 406. Any of the transceiver 402, the transmitter 404, and the receiver 406 may include one or more components or devices described with reference to FIG. 2, such as the modulator/demodulators 232a-t, the MIMO detector 236, the receive processor 238, the transmit processor 220, the TX MIMO processor 230, one or more other components or devices, or a combination thereof. The transceiver 402 may be coupled to the antennas 234a-t of FIG. 2.

The UE 115 may include the controller/processor 280, the memory 282, and a transceiver 462. In some examples, the transceiver 462 includes a transmitter 464 and a receiver 466. Any of the transceiver 462, the transmitter 464, and the receiver 466 may include one or more components or devices described with reference to FIG. 2, such as the modulator/demodulators 254a-r, the MIMO detector 256, the receive processor 258, the transmit processor 264, the TX MIMO processor 266, one or more other components or devices, or a combination thereof. The transceiver 462 may be coupled to the antennas 252a-r of FIG. 2.

The transmitter 404 may be configured to transmit reference signals, synchronization signals, control information, and data to one or more other devices, and the receiver 406 may be configured to receive reference signals, control information, and data from one or more other devices. For example, the transmitter 404 may be configured to transmit signaling, control information, and data to the UE 115, and the receiver 406 may be configured to receive signaling, control information, and data from the UE 115.

The transmitter 464 may be configured to transmit reference signals, synchronization signals, control information, and data to one or more other devices, and the receiver 466 may be configured to receive reference signals, control information, and data from one or more other devices. For example, in some implementations, the transmitter 464 may be configured to transmit signaling, control information, and data to the base station 105, and the receiver 466 may be configured to receive signaling, control information, and data from the base station 105.

In some implementations, one or more of the transmitter 404, the receiver 406, the transmitter 464, or the receiver 466 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

During operation, the base station 105 and the UE 115 may communicate via one or more downlink channels 422, via one or more uplink channels 424, or a combination thereof. For example, the base station 105 may transmit, to the UE 115 via the one or more downlink channels 422, one or more downlink signals 410, such as any of a synchronization signal bock (SSB) 412, a downlink data signal 414, or a downlink control signal 416. As another example, the UE 115 may transmit, to the base station 105 via the one or more uplink channels 424, one or more uplink signals 430, such as one or more of an uplink data signal 432 or an uplink control signal 434. In some implementations, the one or more downlink signals 410 and the one or more uplink signals 430 are included in the capability-based multi-bandwidth communications 150 of FIGS. 1-3.

In connection with communication of any of the downlink signals 410, any of the uplink signals 430, or a combination thereof, the UE 115 may operate based on the one or more multi-bandwidth schemes 450. For example, the UE 115 may operate based on one or more downlink bandwidth amounts 452 in connection with receiving the one or more downlink signals 410. Alternatively or in addition, the UE 115 may operate based on one or more uplink bandwidth amounts 454 in connection with transmitting the one or more uplink signals 430. In some implementations, the one or more multi-bandwidth schemes 450 may specify duty cycles 456 associated with operation of the UE 115.

As used herein, a "bandwidth amount" may refer to a difference between a lower bound of a frequency range and an upper bound of the frequency range. As an illustrative example, a frequency range extending from 2 gigahertz (GHz) to 10 GHz has a bandwidth amount of 8 GHz. Further, a bandwidth amount may be specified using hertz (Hz), physical resource blocks (PRBs), subcarriers (SCs), or other criteria, as described further below.

The base station 105 may configure the UE 115 with one or more aspects of the one or more multi-bandwidth schemes 450. For example, the base station 105 may transmit to the UE 115 one or more configuration messages indicating the one or more downlink bandwidth amounts 452, the one or more uplink bandwidth amounts 454, the duty cycles 456, one or more other parameters, or a combination thereof.

Figure 5:
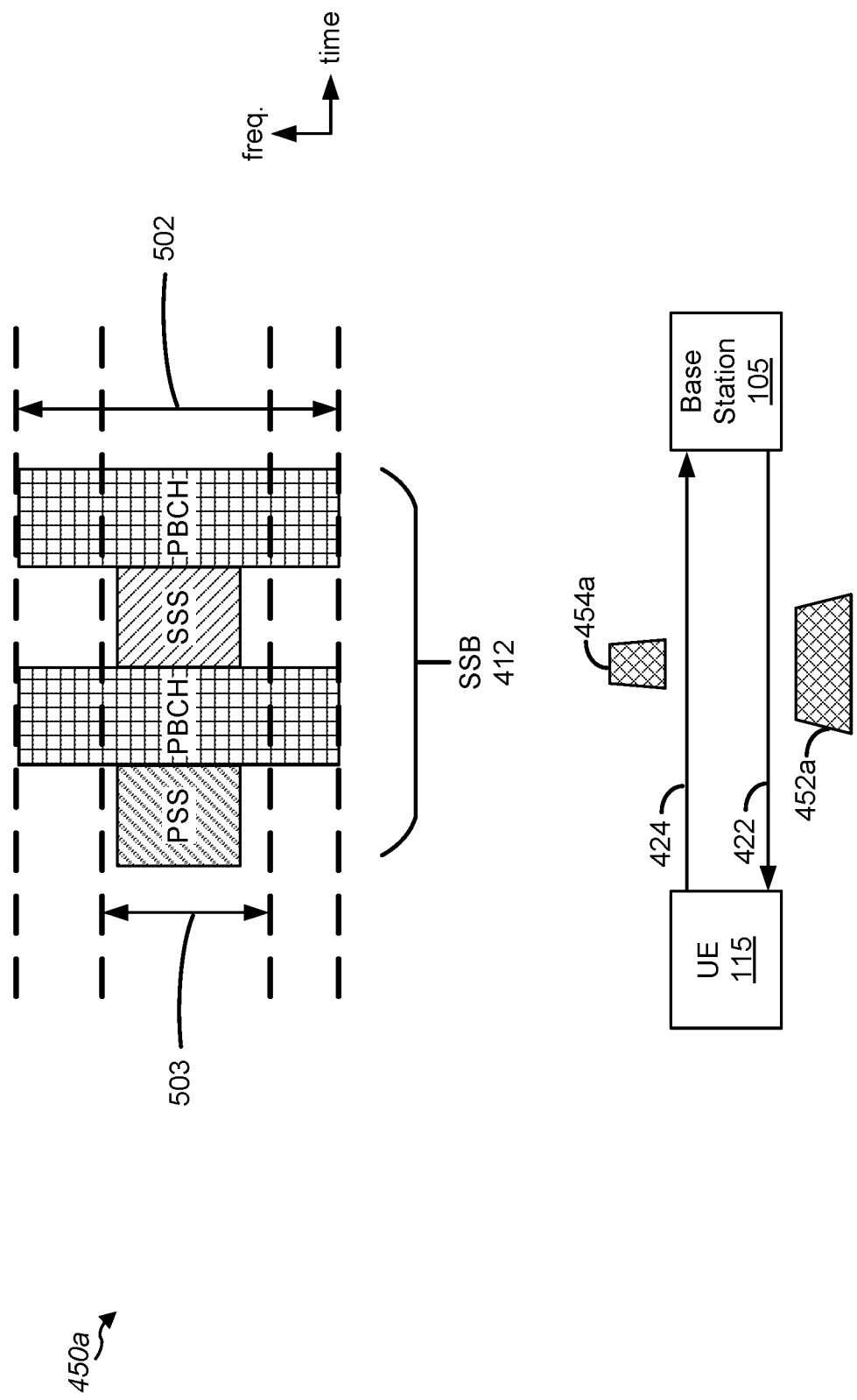
FIG. 5 depicts an example of a multi-bandwidth scheme that may be included in the multi-bandwidth schemes of FIG. 4 according to some aspects of the disclosure.

To further illustrate, FIG. 5 depicts an example of a multi-bandwidth scheme 450a that may be included in the multi-bandwidth schemes 450 of FIG. 4 according to some aspects of the disclosure. In the example of FIG. 5, the base station 105 may transmit, to the UE 115 via the one or more downlink channels 422, a first downlink signal of the one or more downlink signals 410 using a first bandwidth amount 452a of the one or more downlink bandwidth amounts 452. FIG. 5 also illustrates that the UE 115 may transmit, to the base station 105 via the one or more uplink channels 424, a first uplink signal of the one or more uplink signals 430 using a second bandwidth amount 454a of the one or more uplink bandwidth amounts 454. In an example, the second bandwidth amount 454a is less than the first bandwidth amount 452a.

In some implementations, the first bandwidth amount 452a is based on a first frequency range 502 associated with the SSB 412. For example, the first frequency range 502 of the SSB 412 may correspond to one or more of twenty physical resource blocks (PRBs), five megahertz (MHz), or 240 subcarriers (SCs), and the subcarrier spacing (SCS) may be fifteen kilohertz (KHz) or thirty KHz, as illustrative examples.

In the example of FIG. 5, the SSB 412 includes a primary synchronization signal (PSS), physical broadcast channel (PBCH) signals, and a secondary synchronization signal (SSS). In some examples, the PBCH signals occupy the first frequency range 502, and the PSS and the SSS occupy a subset 503 of the first frequency range 502. The subset 503 may be less than the first frequency range 502. For example, the PSS and the SSS may occupy 144 SCs (which may include guard SCs, as illustrated in FIG. 5).

In some implementations, the second bandwidth amount 454*a* is based on a second frequency range associated with an uplink channel of the one or more uplink channels 424. In one example, the second frequency range corresponds to one PRB, and the uplink channel corresponds to a physical uplink control channel (PUCCH), a physical uplink shared channel (PUSCH), or a single-PRB physical random access channel (PRACH). In another example, the second frequency range corresponds to six PRBs, and the uplink channel corresponds to a six-PRB PRACH. The second frequency range may correspond to a minimum transmission size of an uplink channel, such as the minimum transmission size of the PUCCH, the PUSCH, or the PRACH.

Although the example of FIG. 5 illustrates one uplink bandwidth and one downlink bandwidth, in some other examples, the UE 115 may use multiple uplink bandwidths, multiple downlink bandwidths, or both. To illustrate, the UE 115 may transmit, to the base station 105, a second uplink signal of the one or more uplink signals 430 using a third bandwidth amount of the one or more uplink bandwidth amounts 454. In an example, the third bandwidth amount is different than (e.g., less than) the first bandwidth amount 452*a* and is also different than (e.g., greater than or less than) the second bandwidth amount 454*a*.

The third bandwidth amount may be based on a third frequency range of a second uplink channel of the one or more uplink channels 424 accessible to the UE 115. For example, the second frequency range may correspond to one PRB, and the third frequency range may correspond to six PRBs. To further illustrate, the uplink channel may correspond to a PUCCH, a PUSCH, or a single-PRB PRACH, and the third frequency range may correspond to a six-PRB PRACH.

Figure 6:
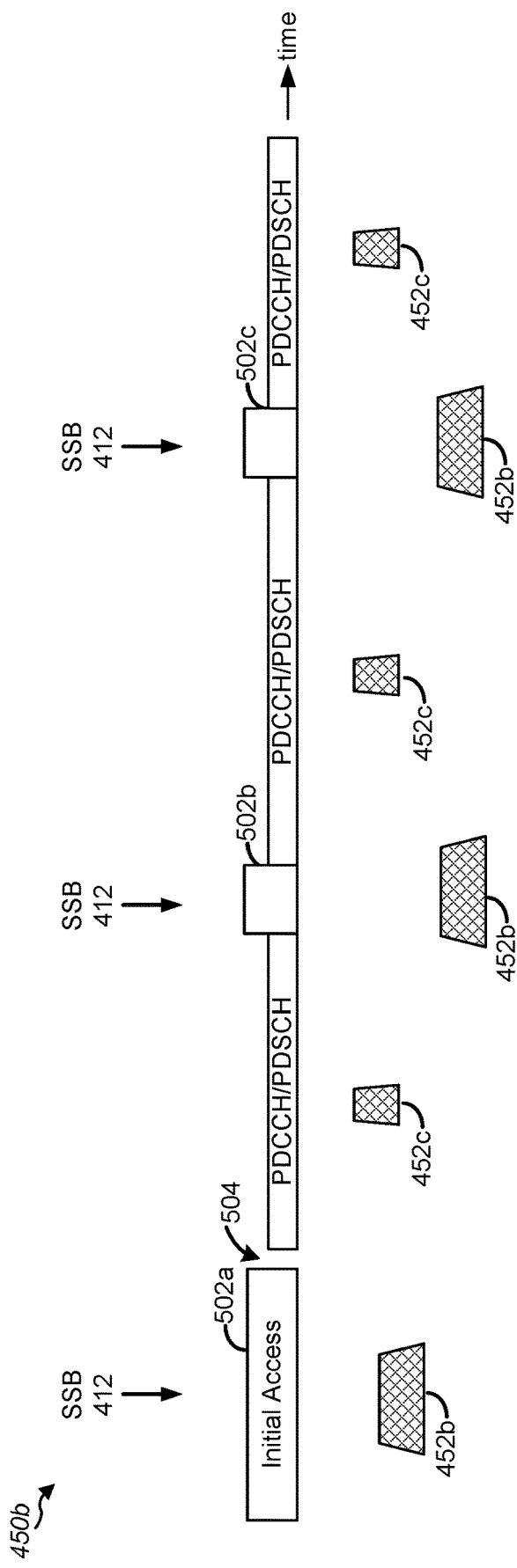
FIG. 6 depicts an example of a multi-bandwidth scheme that may be included in the multi-bandwidth schemes of FIG. 4 according to some aspects of the disclosure.

FIG. 6 depicts an example of a multi-bandwidth scheme 450*b* that may be included in the multi-bandwidth schemes 450 of FIG. 4 according to some aspects of the disclosure. In the example of FIG. 6, the UE 115 may selectively operate based on a first downlink bandwidth amount 452*b* of the one or more downlink bandwidth amounts 452 and based on a second downlink bandwidth amount 452*c* of the one or more downlink bandwidth amounts 452. In an example, the second downlink bandwidth amount 452*c* is less than the first downlink bandwidth amount 452*b*. In an illustrative example, the first downlink bandwidth amount 452*b* corresponds to five MHz, and the second downlink bandwidth amount 452*c* corresponds to one PRB or to six PRBs. In some implementations, the second bandwidth amount is configured by the base station 105 (e.g., via a configuration message).

In some examples, the UE 115 receives the SSB 412 using the first downlink bandwidth amount 452*b* during an SSB-based measurement timing configuration (SMTC) window, such as one or more of an SMTC window 502*a*, an SMTC window 502*b*, or an SMTC window 502*c*. In some examples, during, the SMTC window 502*a*, the UE 115 may perform initial access operations, such as by detecting the base station 105 and establishing communication with the base station 105 based on the SSB 412. During the SMTC windows 502*b-c*, the UE 115 may include perform measurements based on the SSB 412, such as by performing beam sweeping based on the SSB 412 during the SMTC windows 502*b-c*.

During a switching interval following an SMTC window, the UE 115 may adjust from operation based on the first downlink bandwidth amount 452*b* to operation based on the second downlink bandwidth amount 452*c*. For example, a representative switching interval 504 may follow the SMTC window 502*a*, and the UE 115 may adjusting from operation based on based on the first downlink bandwidth amount 452*b* to operation based on the second downlink bandwidth amount 452*c* during the switching interval 504. In some examples, the UE 115 is configured to automatically switch during switching intervals (such as the switching interval 504). For example, the UE 115 may be configured to perform adjustment during certain time slots following an SMTC window and prior to a downlink occasion.

After switching from operation based on the first downlink bandwidth amount 452*b* to operation based on the second downlink bandwidth amount 452*c*, the UE 115 may receive one or both of a downlink data signal or a downlink control signal using the second downlink bandwidth amount 452*c*, such as the downlink data signal 414, the downlink control signal 416, or both. In some examples, the UE 115 receives the downlink data signal via a physical downlink control channel (PDCCH) or via a physical downlink shared channel (PDSCH).

Figure 7:
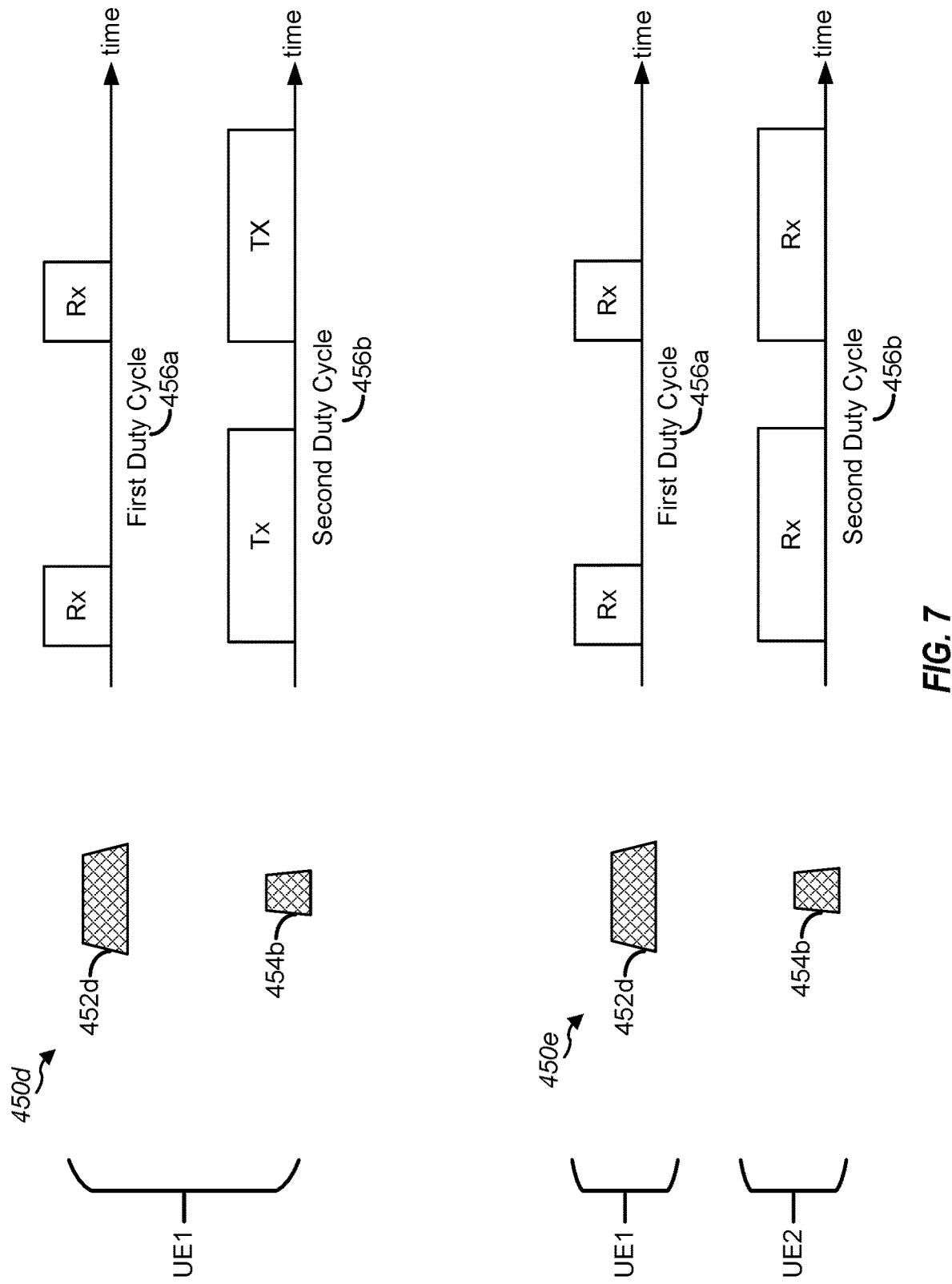
FIG. 7 depicts examples of multi-bandwidth schemes and that may be included in the multi-bandwidth schemes of FIG. 4 according to some aspects of the disclosure.

FIG. 7 depicts examples of multi-bandwidth schemes 450*d* and 450*e* that may be included in the multi-bandwidth schemes 450 of FIG. 4 according to some aspects of the disclosure. In some examples, one more aspects of FIG. 7 may enable a common data rate for uplink and downlink communications of a single UE (such as illustrated in the multi-bandwidth scheme 450*d*) or may enable a common data rate for downlink communications of multiple UEs (such as illustrated in the multi-bandwidth scheme 450*e*).

In the example of the multi-bandwidth schemes 450*d*, the UE 115 may selectively operate based on a first bandwidth amount 452*d* and a second bandwidth amount 454*b*. During operation based on the first bandwidth amount 452*d*, the UE 115 may operate based on a first duty cycle 456*a* of the duty cycles 456. For example, during operation based on the first duty cycle 456*a*, the UE 115 may receive a downlink signal of the one or more downlink signals 410 using the first bandwidth amount 452*d*. Use of the first bandwidth amount 452*d* and the first duty cycle 456*a* may enable a particular data rate.

The UE 115 may adjust from operation based on the first duty cycle 456*a* to operation based on a second duty cycle 456*b* that is greater than the first duty cycle 456*a*. For example, during operation based on the second duty cycle 456*b*, the UE 115 may transmit an uplink signal of the one or more uplink signals 430 using the second bandwidth amount 454*b*. Use of the second bandwidth amount 454*b* and the second duty cycle 456*b* may enable the same particular data rate associated with the first bandwidth amount 452*d* and the first duty cycle 456*a*. In some examples, operation by the UE 115 based on the first duty cycle 456*a* is associated with a first power consumption, and operation by the UE 115 based on the second duty cycle 456*b* is associated with a second power consumption that is less than the first power consumption.

Alternatively or in addition, multiple UEs may be associated with different duty cycles to enable a common data rate among the multiple UEs. For example, a first UE 115 ("UE1") may receive a first downlink signal based on the first bandwidth amount 452*d* and the first duty cycle 456*a*, and a second UE 115 ("UE2") may receive a second downlink signal based on the second bandwidth amount 454*b* and the second duty cycle 456*b*. In some examples, operation by the first UE 115 based on the first duty cycle 456*a* is associated with a first power consumption, and operation by the second UE 115 based on the second duty cycle 456*b* is associated with a second power consumption that is less than the first power consumption. In some examples, the first UE 115 of FIG. 7 corresponds to a high-power device, such as a device that supports eMBB or URLLC features. In some examples, the second UE 115 of FIG. 7 corresponds to a low-power device, such as a RedCap device, a metering device, an asset tracking device, or a personal IoT device, as illustrative examples.

Although certain relations between some parameters have been described for illustration, it is noted that other examples are also within the scope of the disclosure. For example, a particular bandwidth amount may be described as being less than another bandwidth amount. In some other implementations, the particular bandwidth amount may be greater than or equal to the other bandwidth amount. As another example, a particular duty cycle may be described as being less than another duty cycle. In some other implementations, the particular duty cycle may be greater than or equal to the other duty cycle. As an additional example, a particular power consumption may be described as being less than another power consumption. In some other implementations, the particular power consumption may be greater than or equal to the other power consumption.

One or more aspects described herein may improve performance of certain devices, such as a "light" or "super-light" device. For example, the UE 115 may be configured with different bandwidth amounts for uplink and downlink communications, which may reduce device complexity and power consumption associated with uplink communications in some cases (such as where the uplink bandwidth amount is less than the downlink bandwidth amount). Alternatively or in addition, the UE 115 may be configured with different bandwidth amounts for different channels, which may reduce device complexity and power consumption as compared to some techniques that assign a same bandwidth amount to different channels. Alternatively or in addition, different duty cycles may be associated with different bandwidth amounts, which may enable a common data rate among the different bandwidth amounts (and which may avoid a circumstance in which a larger bandwidth amount is associated with a high data rate, which may increase power consumption and which may be unnecessary for certain devices).

FIG. 8 is a flow chart illustrating an example of a method 800 of wireless communication according to some aspects of the disclosure. In some examples, the method 800 is performed by the UE 115.

The method 800 includes receiving, by a UE from a base station, a first downlink signal using a first bandwidth amount that is based on a first frequency range associated with a particular signal transmitted by the base station, at 802. For example, the first downlink signal may be included in the one or more downlink signals 410. The first bandwidth amount may correspond to the first bandwidth amount 452*a*, which may be based on the first frequency range 502. The particular signal may correspond to the SSB 412.

The method 800 further includes transmitting, by the UE to the base station, a first uplink signal using a second bandwidth amount, at 804. The second bandwidth amount is less than the first bandwidth amount, and the second bandwidth amount is based on a second frequency range associated with an uplink channel accessible to the UE. For example, the uplink signal may be included in the one or more uplink signals 430. The second bandwidth amount may correspond to the second bandwidth amount 454*a*, and the second frequency range may correspond to one PRB or six PRBs, as illustrative examples.

FIG. 9 is a flow chart illustrating an example of a method 900 of wireless communication according to some aspects of the disclosure. In some examples, the method 900 is performed by the base station 105.

The method 900 includes transmitting, by a base station to a UE, a first downlink signal using a first bandwidth amount that is based on a first frequency range associated with a particular signal transmitted by the base station, at 902. For example, the first downlink signal may be included in the one or more downlink signals 410. The first bandwidth amount may correspond to the first bandwidth amount 452*a*, which may be based on the first frequency range 502. The particular signal may correspond to the SSB 412.

The method 900 further includes receiving, by the base station from the UE, a first uplink signal using a second bandwidth amount, at 904. The second bandwidth amount is less than the first bandwidth amount, and the second bandwidth amount is based on a second frequency range associated with an uplink channel accessible to the UE. For example, the uplink signal may be included in the one or more uplink signals 430. The second bandwidth amount may correspond to the second bandwidth amount 454*a*, and the second frequency range may correspond to one PRB or six PRBs, as illustrative examples.

Figures 10, 11:
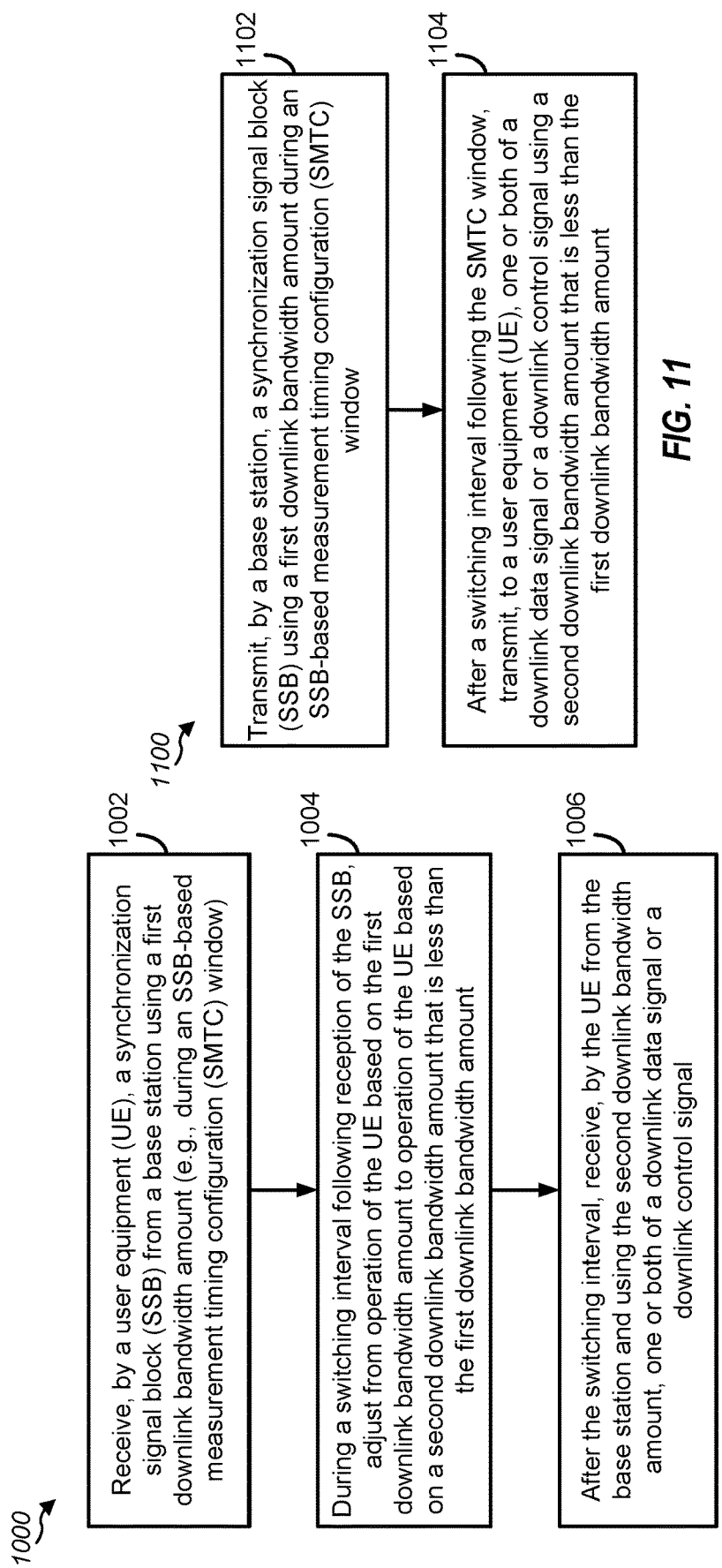
FIG. 10 is a flow chart illustrating an example of a method of wireless communication according to some aspects of the disclosure.
FIG. 11 is a flow chart illustrating an example of a method of wireless communication according to some aspects of the disclosure.

FIG. 10 is a flow chart illustrating an example of a method 1000 of wireless communication according to some aspects of the disclosure. In some examples, the method 1000 is performed by the UE 115.

The method 1000 includes receiving, by a UE, a synchronization signal block (SSB) from a base station using a first downlink bandwidth amount, at 1002. In some examples, the SSB optionally may be received during an SSB-based measurement timing configuration (SMTC) window. For example, the UE 115 may receive the SSB 412 during one or more of the SMTC windows 502*a-c*, and the first downlink bandwidth amount may correspond to the first downlink bandwidth amount 452*b*.

The method 1000 further includes, during a switching interval following reception of the SSB, adjusting from operation of the UE based on the first downlink bandwidth amount to operation of the UE based on a second downlink bandwidth amount that is less than the first downlink bandwidth amount, at 1004. For example, the UE 115 may adjust from operation based on the first downlink bandwidth amount 452*b* to operation based on the second downlink bandwidth amount 452*c*.

The method 1000 further includes, after the switching interval, receiving, by the UE from the base station and using the second downlink bandwidth amount, one or both of a downlink data signal or a downlink control signal, at 1006. For example, the UE 115 may receive one or both of the downlink data signal 414 or the downlink control signal 416 from the base station 105 using the second downlink bandwidth amount 452*c*.

FIG. 11 is a flow chart illustrating an example of a method 1100 of wireless communication according to some aspects of the disclosure. In some examples, the method 1100 is performed by the base station 105.

The method 1100 includes transmitting, by a base station, an SSB using a first downlink bandwidth amount during an SMTC window, at 1102. For example, the base station 105 may transmit the SSB 412 during one or more of the SMTC windows 502a-c, and the first downlink bandwidth amount may correspond to the first downlink bandwidth amount 452b.

The method 1100 further includes, after a switching interval following the SMTC window, transmitting, to a UE, one or both of a downlink data signal or a downlink control signal using a second downlink bandwidth amount that is less than the first downlink bandwidth amount, at 1104. For example, the base station 105 may transmit one or both of the downlink data signal 414 or the downlink control signal 416 to the UE 115 using the second downlink bandwidth amount 452c.

FIG. 12 is a flow chart illustrating an example of a method 1200 of wireless communication according to some aspects of the disclosure. In some examples, the method 1200 is performed by the UE 115.

The method 1200 includes, during operation by a UE based on a first duty cycle, receiving, by the UE from a base station, a downlink signal using a first bandwidth amount and based on a particular data rate, at 1202. For example, the first duty cycle may correspond to the first duty cycle 456a. The UE 115 may receive a downlink signal of the one or more downlink signals 410 during operation based on the first duty cycle 456a and using the first bandwidth amount 452d.

The method 1200 further includes, after receiving the downlink signal, adjusting from operation by the UE based on the first duty cycle to operation by the UE based on a second duty cycle that is greater than the first duty cycle, at 1204. For example, the UE 115 may adjust from operation based on the first duty cycle 456a to operation based on the second duty cycle 456b.

The method 1200 further includes, during operation by the UE based on the second duty cycle, transmitting, by the UE to the base station, an uplink signal using a second bandwidth amount that is less than the first bandwidth amount and based on the particular data rate, at 1206. For example, the UE 115 may transmit an uplink signal of the one or more uplink signals 430 during operation based on the second duty cycle 456b and using the second bandwidth amount 454b.

FIG. 13 is a flow chart illustrating an example of a method 1300 of wireless communication according to some aspects of the disclosure. In some examples, the method 1300 is performed by the base station 105.

The method 1300 includes transmitting, by a base station to a first UE, a first downlink signal using a first bandwidth amount and based on a particular data rate, at 1302. The first UE operates based on a first duty cycle to receive the first downlink signal. For example, the first duty cycle may correspond to the first duty cycle 456a. The base station 105 may transmit, to a first UE 115 (e.g., "UE1" of FIG. 7), a downlink signal of the one or more downlink signals 410 during operation of the first UE 115 based on the first duty cycle 456a and using the first bandwidth amount 452d.

The method 1300 further includes transmitting, by the base station to a second UE, a second downlink signal using a second bandwidth amount that is less than the first bandwidth amount and based on the particular data rate, at 1304. The second UE operates based on a second duty cycle that is greater than the first duty cycle to receive the second downlink signal. For example, the base station 105 may transmit, to a second UE 115 (e.g., "UE2" of FIG. 7) a downlink signal of the one or more downlink signals 410 during operation of the second UE 115 based on the second duty cycle 456b and using the second bandwidth amount 454b.

Figure 14:
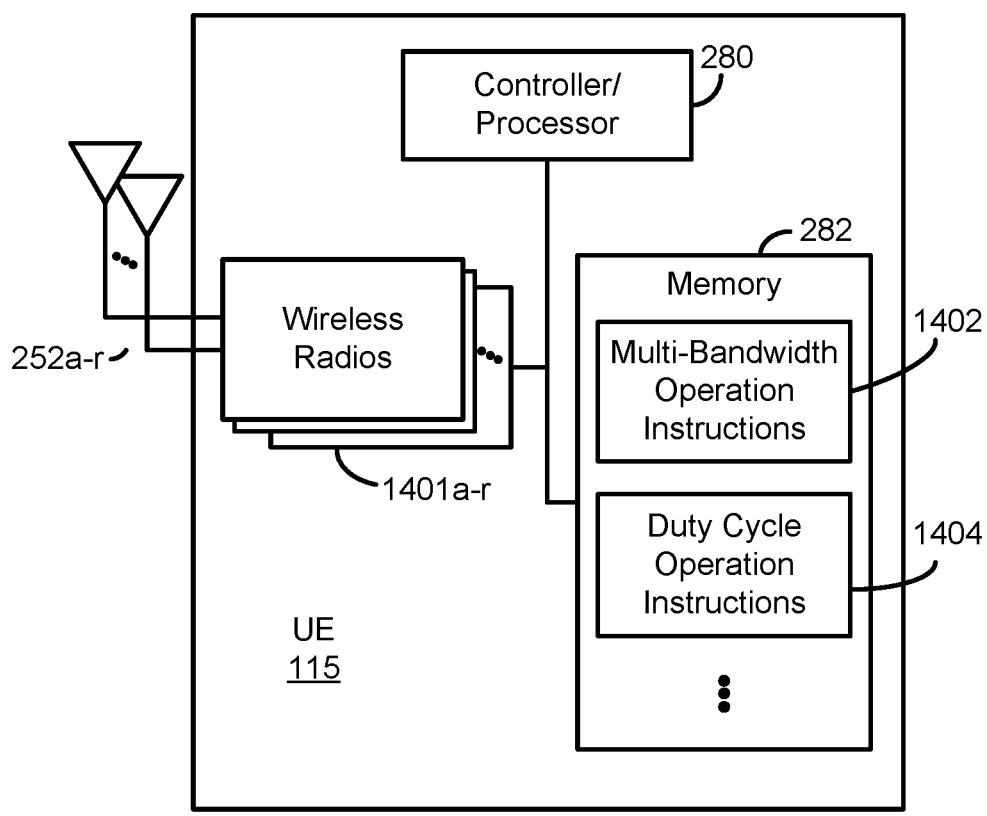
FIG. 14 is a block diagram illustrating an example of a UE according to some aspects of the disclosure.

FIG. 14 is a block diagram illustrating an example of a UE 115 according to some aspects of the disclosure. The UE 115 may include structure, hardware, or components illustrated in FIG. 2. For example, the UE 115 may include the controller/processor 280, which may execute instructions stored in the memory 282. Using the controller/processor 280, the UE 115 may transmit and receive signals via wireless radios 1401a-r and antennas 252a-r. For example, the controller/processor 280 may control reception of the one or more downlink signals 410 and may initiate transmission of the one or more uplink signals 430. The wireless radios 1401a-r may include one or more components or devices described herein, such as the modulator/demodulators 254a-r, the MIMO detector 256, the receive processor 258, the transmit processor 264, the TX MIMO processor 266, the transceiver 462, the transmitter 464, the receiver 466, one or more other components or devices, or a combination thereof.

In some examples, the controller/processor 280 executes multi-bandwidth operation instructions 1402 to cause the wireless radios 1401a-r to operate based on any of the one or more downlink bandwidth amounts 452, any of the one or more uplink bandwidth amounts 454, or both. For example, the UE 115 may receive one or more configuration messages from the base station 105 indicating any of the one or more downlink bandwidth amounts 452, any of the one or more uplink bandwidth amounts 454, or both, and the controller/processor 280 may execute the multi-bandwidth operation instructions 1402 to cause the wireless radios 1401a-r to operate based on the bandwidth amounts indicated by the one or more configuration messages. In some examples, the controller/processor 280 executes duty cycle operation instructions 1404 to operate based on the duty cycles 456. For example, the controller/processor 280 may execute the duty cycle operation instructions 1404 to select among the duty cycles 456 based on the bandwidth amounts indicated by the one or more configuration messages received from the base station 105 and to operate based on the selected duty cycles 456.

Figure 15:
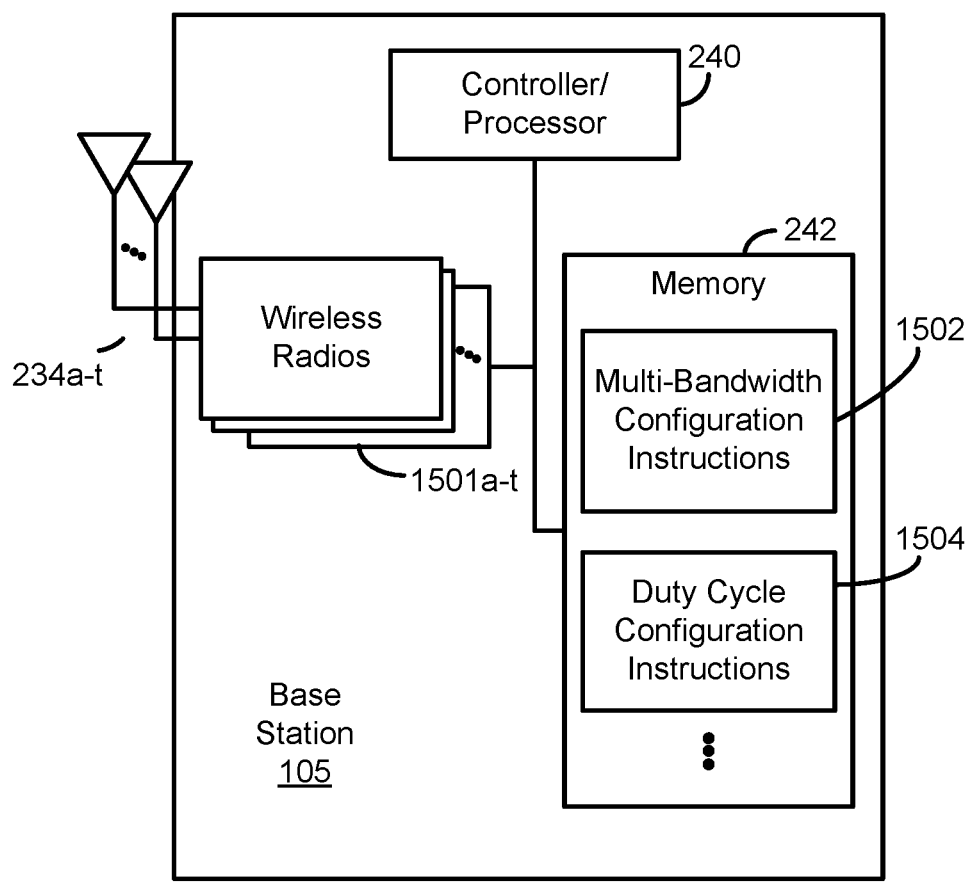
FIG. 15 is a block diagram illustrating an example of a base station according to some aspects of the disclosure.

FIG. 15 is a block diagram illustrating an example of a base station 105 according to some aspects of the disclosure. The base station 105 may include structure, hardware, and components illustrated in FIG. 2. For example, the base station 105 may include the controller/processor 240, which may execute instructions stored in memory 242. Under control of the controller/processor 240, the base station 105 may transmit and receive signals via wireless radios 1501a-t and antennas 234a-t. For example, the controller/processor 240 may initiate transmission of the one or more downlink signals 410 and may control reception of the one or more uplink signals 430. The wireless radios 1501a-t may include one or more components or devices described herein, such as the modulator/demodulators 232a-t, the MIMO detector 236, the receive processor 238, the transmit processor 220, the TX MIMO processor 230, the transceiver 402, the transmitter 404, the receiver 406, one or more other components or devices, or a combination thereof.

In some examples, the controller/processor 240 executes multi-bandwidth configuration instructions 1502 to configure the UE 115 with any of the one or more downlink bandwidth amounts 452, any of the one or more uplink bandwidth amounts 454, or both. For example, the base station 105 may execute the multi-bandwidth configuration instructions 1502 to transmit, to the UE 115, one or more configuration messages indicating any of the one or more downlink bandwidth amounts 452, any of the one or more uplink bandwidth amounts 454, or both, and the UE 115 may operate based on the bandwidth amounts indicated by the one or more configuration messages. In some examples, the controller/processor 240 executes duty cycle configuration instructions 1504 to configure the UE with the duty cycles 456. For example, the controller/processor 240 may execute the duty cycle configuration instructions 1504 to cause the base station 105 to transmit to the UE 115 one or more configuration messages indicating the duty cycles 456.

According to some further aspects, in a first aspect, a method of wireless communication includes receiving, by a UE from a base station, a first downlink signal using a first bandwidth amount that is based on a first frequency range associated with a particular signal transmitted by the base station. The method further includes transmitting, by the UE to the base station, a first uplink signal using a second bandwidth amount. The second bandwidth amount is less than the first bandwidth amount, and the second bandwidth amount is based on a second frequency range associated with an uplink channel accessible to the UE.

In a second aspect alternatively or in addition to the first aspect, the particular signal corresponds to an SSB.

In a third aspect alternatively or in addition to any of the first through second aspects, the first frequency range corresponds to one or more of five MHz, twenty PRBs, 240 SCs, or a fifteen KHz SCS.

In a fourth aspect alternatively or in addition to any of the first through third aspects, the frequency range associated with the uplink channel corresponds to one PRB, and the uplink channel corresponds to a PUCCH, a PUSCH, or a single-PRB PRACH.

In a fifth aspect alternatively or in addition to any of the first through fourth aspects, the second frequency range corresponds to six PRBs, and the uplink channel corresponds to a six-PRB PRACH.

In a sixth aspect, the method includes transmitting, by the UE to the base station, a second uplink signal using a third bandwidth amount different than the first bandwidth amount and the second bandwidth amount, and the third bandwidth amount is based on a third frequency range associated with a second uplink channel accessible to the UE.

In a seventh aspect alternatively or in addition to the sixth aspect, the second frequency range corresponds to one PRB, and the third frequency range corresponds to six PRBs.

In an eighth aspect alternatively or in addition to any of the sixth through seventh aspects, the uplink channel corresponds to a PUCCH, a PUSCH, or a single-PRB PRACH, and the third frequency range corresponds to a six-PRB PRACH.

In a ninth aspect alternatively or in addition to any of the sixth through eighth aspects, the method includes receiving, from the base station, one or more configuration messages indicating the first bandwidth amount and the second bandwidth amount.

In a tenth aspect, a method of wireless communication includes transmitting, by a base station to a UE, a first downlink signal using a first bandwidth amount that is based on a first frequency range associated with a particular signal transmitted by the base station. The method further includes receiving, by the base station from the UE, a first uplink signal using a second bandwidth amount. The second bandwidth amount is less than the first bandwidth amount, and the second bandwidth amount is based on a second frequency range associated with an uplink channel accessible to the UE.

In an eleventh aspect alternatively or in addition to the tenth aspect, the particular signal corresponds to an SSB.

In a twelfth aspect alternatively or in addition to any of the tenth through tenth aspects, the first frequency range corresponds to one or more of five MHz, twenty PRBs, 240 SCs, or a fifteen KHz SCS.

In a thirteenth aspect alternatively or in addition to any of the tenth through twelfth aspects, the second frequency range corresponds to one PRB, and the uplink channel corresponds to a PUCCH, a PUSCH, or a single-PRB PRACH.

In a fourteenth aspect alternatively or in addition to any of the tenth through thirteenth aspects, the second frequency range corresponds to six PRBs, and the uplink channel corresponds to a six-PRB PRACH.

In a fifteenth aspect alternatively or in addition to any of the tenth through fourteenth aspects, the method includes transmitting, by the UE to the base station, a second uplink signal using a third bandwidth amount different than the first bandwidth amount and the second bandwidth amount, and the third bandwidth amount is based on a third frequency range associated with a second uplink channel accessible to the UE.

In a sixteenth aspect alternatively or in addition to any of the tenth through fifteenth aspects, the second frequency range corresponds to one PRB, and the third frequency range corresponds to six PRBs.

In a seventeenth aspect alternatively or in addition to any of the tenth through sixteenth aspects, the uplink channel corresponds to a PUCCH, a PUSCH, or a single-PRB PRACH, and the third frequency range corresponds to a six-PRB PRACH.

In an eighteenth aspect alternatively or in addition to any of the tenth through seventeenth aspects, the method includes transmitting, to the UE, one or more configuration messages indicating the first bandwidth amount and the second bandwidth amount.

In a nineteenth aspect, a method of wireless communication includes receiving, by a UE, an SSB from a base station using a first downlink bandwidth amount during an SMTC window. The method further includes, during a switching interval following the SMTC window, adjusting from operation of the UE based on the first downlink bandwidth amount to operation of the UE based on a second downlink bandwidth amount that is less than the first downlink bandwidth amount. The method further includes, after the switching interval, receiving, by the UE from the base station and using the second downlink bandwidth amount, one or both of a downlink data signal or a downlink control signal.

In a twentieth aspect alternatively or in addition to the nineteenth aspect, the UE receives the control signal via a PDCCH.

In a twenty-first aspect alternatively or in addition to any of the nineteenth through twentieth aspects, the UE receives the downlink data signal via a PDSCH.

In a twenty-second aspect alternatively or in addition to any of the nineteenth through twenty-first aspects, the first bandwidth amount corresponds to five MHz.

In a twenty-third aspect alternatively or in addition to any of the nineteenth through twenty-second aspects, the second bandwidth amount corresponds to one PRB or six PRBs.

In a twenty-fourth aspect alternatively or in addition to any of the nineteenth through twenty-third aspects, the second bandwidth amount is configured by the base station.

In a twenty-fifth aspect, a method of wireless communication includes transmitting, by a base station, an SSB using a first downlink bandwidth amount during an SMTC window. The method further includes, after a switching interval following the SMTC window, transmitting, to a UE, one or both of a downlink data signal or a downlink control signal using a second downlink bandwidth amount that is less than the first downlink bandwidth amount.

In a twenty-sixth aspect alternatively or in addition to the twenty-fifth aspect, the base station transmits the control signal via a PDCCH.

In a twenty-seventh aspect alternatively or in addition to any of the twenty-fifth through twenty-sixth aspects, the base station transmits the downlink data signal via a PDSCH.

In a twenty-eighth aspect alternatively or in addition to any of the twenty-fifth through twenty-seventh aspects, the first bandwidth amount corresponds to five MHz.

In a twenty-ninth aspect alternatively or in addition to any of the twenty-fifth through twenty-eighth aspects, the second bandwidth amount corresponds to one PRB.

In a thirtieth aspect alternatively or in addition to any of the twenty-fifth through twenty-ninth aspects, the second bandwidth amount is configured by the base station.

In a thirty-first aspect, a method of wireless communication includes, during operation by a UE based on a first duty cycle, receiving, by the UE from a base station, a downlink signal using a first bandwidth amount and based on a particular data rate. The method further includes, after receiving the downlink signal, adjusting from operation by the UE based on the first duty cycle to operation by the UE based on a second duty cycle that is greater than the first duty cycle. The method further includes, during operation by the UE based on the second duty cycle, transmitting, by the UE to the base station, an uplink signal using a second bandwidth amount that is less than the first bandwidth amount and based on the particular data rate.

In a thirty-second aspect alternatively or in addition to the thirty-first aspect, operation by the UE based on the first duty cycle is associated with a first power consumption, and operation by the UE based on the second duty cycle is associated with a second power consumption that is less than the first power consumption.

In a thirty-third aspect, a method of wireless communication includes transmitting, by a base station to a first UE, a first downlink signal using a first bandwidth amount and based on a particular data rate. The first UE operates based on a first duty cycle to receive the first downlink signal. The method further includes transmitting, by the base station to a second UE, a second downlink signal using a second bandwidth amount that is less than the first bandwidth amount and based on the particular data rate. The second UE operates based on a second duty cycle that is greater than the first duty cycle to receive the second downlink signal.

In a thirty-fourth aspect alternatively or in addition to the thirty-third aspect, operation by the first UE based on the first duty cycle is associated with a first power consumption, and operation by the second UE based on the second duty cycle is associated with a second power consumption that is less than the first power consumption.

In a thirty-fifth aspect, a non-transitory computer-readable medium stores instructions executable by a processor to perform the method of one or more of the first through thirty-fourth aspects.

In a thirty-sixth aspect, an apparatus includes a memory and a processor coupled to the memory. The processor configured to perform the method of one or more of the first through thirty-fourth aspects.

In a thirty-seventh aspect, an apparatus for wireless communications includes a processor and a memory that includes instructions. The one or more processors are configured to execute the instructions to control reception, from a base station, of a first downlink signal using a first bandwidth amount that is based on a first frequency range associated with a particular signal transmitted by the base station. The one or more processors are further configured to execute the instructions to initiate transmission, to the base station, of a first uplink signal using a second bandwidth amount. The second bandwidth amount is less than the first bandwidth amount, and the second bandwidth amount is based on a second frequency range associated with an uplink channel. In some implementations, the apparatus may comprise a chipset or a UE.

In a thirty-eighth aspect alternatively or in addition to the thirty-seventh aspect, the particular signal corresponds to an SSB.

In a thirty-ninth aspect alternatively or in addition to one or more of the thirty-seventh through thirty-eighth aspects, the first frequency range corresponds to one or more of five megahertz (MHz), twenty physical resource blocks (PRBs), or 240 subcarriers (SCs), and a subcarrier spacing (SCS) associated with the first frequency range corresponds to fifteen kilohertz (KHz).

In a fortieth aspect alternatively or in addition to one or more of the thirty-seventh through thirty-ninth aspects, the second frequency range associated with the uplink channel corresponds to one physical resource block (PRB), and the uplink channel corresponds to a physical uplink control channel (PUCCH), a physical uplink shared channel (PUSCH), or a single-PRB physical random access channel (PRACH).

In a forty-first aspect alternatively or in addition to one or more of the thirty-seventh through fortieth aspects, the second frequency range corresponds to six physical resource blocks (PRBs), and the uplink channel corresponds to a six-PRB physical random access channel (PRACH).

In a forty-second aspect alternatively or in addition to one or more of the thirty-seventh through forty-first aspects, the one or more processors are further configured to initiate transmission, to the base station, of a second uplink signal using a third bandwidth amount different than the first bandwidth amount and the second bandwidth amount, and the third bandwidth amount is based on a third frequency range associated with a second uplink channel.

In a forty-third aspect alternatively or in addition to one or more of the thirty-seventh through forty-second aspects, the second frequency range corresponds to one physical resource block (PRB), and the third frequency range corresponds to six PRBs.

In a forty-fourth aspect alternatively or in addition to one or more of the thirty-seventh through forty-third aspects, the uplink channel corresponds to a physical uplink control channel (PUCCH), a physical uplink shared channel (PUSCH), or a single physical resource block (PRB) physical random access channel (PRACH), and the third frequency range corresponds to a six-PRB PRACH.

In a forty-fifth aspect alternatively or in addition to one or more of the thirty-seventh through forty-fifth aspects, the one or more processors are further configured to control reception, from the base station, of one or more configuration messages indicating the first bandwidth amount and the second bandwidth amount.

In a forty-sixth aspect alternatively or in addition to one or more of the thirty-seventh through forty-fifth aspects, the one or more processors are further configured to control reception of the first downlink signal based on at least one of a first duty cycle or a particular data rate, and to initiate transmission of the first uplink signal based on at least one of a second duty cycle that is greater than the first duty cycle of the particular data rate.

In a forty-seventh aspect alternatively or in addition to one or more of the thirty-seventh through forty-sixth aspects, the apparatus includes a receiver configured to receive the first downlink signal from the base station and a transmitter configured to transmit the first uplink signal to the base station. The apparatus is configured as a user equipment (UE).

In a forty-eighth aspect alternatively or in addition to one or more of the thirty-seventh through forty-seventh aspects, operation of the receiver based on the first duty cycle is associated with a first power consumption of the receiver, and operation of the transmitter based on the second duty cycle is associated with a second power consumption of the transmitter that is less than the first power consumption.

In a forty-ninth aspect, an apparatus for wireless communications includes a processor and a memory and one or more processors coupled to the memory. The one or more processors are configured to execute the instructions to initiate transmission, to a user equipment (UE), of a first downlink signal using a first bandwidth amount that is based on a first frequency range associated with a particular signal. The one or more processors are further configured to execute the instructions to control reception, from the UE, of a first uplink signal using a second bandwidth amount. The second bandwidth amount is less than the first bandwidth amount, and the second bandwidth amount is based on a second frequency range associated with an uplink channel that is associated with the UE. In some implementations, the apparatus may comprise a chipset or a base station.

In a fiftieth aspect alternatively or in addition to the forty-ninth aspect, the particular signal corresponds to an SSB.

In a fifty-first aspect alternatively or in addition to one or more of the forty-ninth through fiftieth aspects, the first frequency range corresponds to one or more of five megahertz (MHz), twenty physical resource blocks (PRBs), or 240 subcarriers (SCs), and wherein a subcarrier spacing (SCS) associated with the first frequency range corresponds to fifteen kilohertz (KHz).

In a fifty-second aspect alternatively or in addition to one or more of the forty-ninth through fifty-first aspects, the second frequency range corresponds to one physical resource block (PRB), and wherein the uplink channel corresponds to a physical uplink control channel (PUCCH), a physical uplink shared channel (PUSCH), or a single-PRB physical random access channel (PRACH).

In a fifty-third aspect alternatively or in addition to one or more of the forty-ninth through fifty-second aspects, the second frequency range corresponds to six physical resource blocks (PRBs), and the uplink channel corresponds to a six-PRB physical random access channel (PRACH).

In a fifty-fourth aspect alternatively or in addition to one or more of the forty-ninth through fifty-third aspects, the one or more processors are further configured to control reception, from the UE, of a second uplink signal using a third bandwidth amount different than the first bandwidth amount and the second bandwidth amount, and the third bandwidth amount is based on a third frequency range associated with a second uplink channel that is associated with the UE.

In a fifty-fifth aspect alternatively or in addition to one or more of the forty-ninth through fifty-fourth aspects, the second frequency range corresponds to one physical resource block (PRB), and the third frequency range corresponds to six PRBs.

In a fifty-sixth aspect alternatively or in addition to one or more of the forty-ninth through fifty-fifth aspects, the uplink channel corresponds to a physical uplink control channel (PUCCH), a physical uplink shared channel (PUSCH), or a single physical resource block (PRB) physical random access channel (PRACH), and the third frequency range corresponds to a six-PRB PRACH.

In a fifty-seventh aspect alternatively or in addition to one or more of the forty-ninth through fifty-sixth aspects, the one or more processors are further configured to initiate transmission, to the UE, of one or more configuration messages indicating the first bandwidth amount and the second bandwidth amount.

In a fifty-eighth aspect alternatively or in addition to one or more of the forty-ninth through fifty-seventh aspects, the one or more processors are further configured to initiate transmission of the first downlink signal using the first bandwidth amount, based on a particular data rate, and based on a first duty cycle of the UE, and to initiate transmission of a second downlink signal to a second UE using the second bandwidth amount, based on the particular data rate, and based on a second duty cycle of the second UE that is greater than the first duty cycle. Operation by the UE based on the first duty cycle is associated with a first power consumption of the UE, and operation by the second UE based on the second duty cycle is associated with a second power consumption of the second UE that is less than the first power consumption.

In a fifty-ninth aspect alternatively or in addition to one or more of the forty-ninth through fifty-eighth aspects, the apparatus includes a transmitter configured to transmit the first downlink signal to the UE and a receiver configured to receive the first uplink signal from the UE.

In a sixtieth aspect, an apparatus for wireless communication includes a processor and a memory that includes instructions. The one or more processors are configured to execute the instructions to control reception of a synchronization signal block (SSB) from a base station using a first downlink bandwidth amount. The one or more processors are further configured to execute the instructions to adjust, during a switching interval following reception of the SSB, from operation based on the first downlink bandwidth amount to operation based on a second downlink bandwidth amount that is less than the first downlink bandwidth amount. The one or more processors are further configured to execute the instructions to control reception, after the switching interval, of one or both of a downlink data signal or a downlink control signal from the base station that are associated with the second downlink bandwidth amount.

In a sixty-first aspect alternatively or in addition to the sixtieth aspect, the downlink control signal is transmitted via a physical downlink control channel (PDCCH).

In a sixty-second aspect alternatively or in addition to one or more of the sixtieth through sixty-first aspects, the downlink data signal is transmitted via a physical downlink shared channel (PDSCH).

In a sixty-third aspect alternatively or in addition to one or more of the sixtieth through sixty-second aspects, the first downlink bandwidth amount corresponds to five megahertz (MHz).

In a sixty-fourth aspect alternatively or in addition to one or more of the sixtieth through sixty-third aspects, the second downlink bandwidth amount corresponds to one physical resource block (PRB).

In a sixty-fifth aspect alternatively or in addition to one or more of the sixtieth through sixty-fourth aspects, the second downlink bandwidth amount corresponds to six physical resource blocks (PRBs).

In a sixty-sixth aspect alternatively or in addition to one or more of the sixtieth through sixty-fifth aspects, the second downlink bandwidth amount is configured by the base station.

In a sixty-seventh aspect alternatively or in addition to one or more of the sixtieth through sixty-sixth aspects, the apparatus includes a transmitter and a receiver configured to receive the SSB, the downlink data signal, and the downlink control signal.

In a sixty-eighth aspect alternatively or in addition to one or more of the sixtieth through sixty-seventh aspects, the apparatus is configured as a user equipment (UE).

In a sixty-ninth aspect, an apparatus for wireless communication includes a processor and a memory that includes instructions. The one or more processors are configured to execute the instructions to initiate transmission of a synchronization signal block (SSB) using a first downlink bandwidth amount. The one or more processors are further configured to execute the instructions to initiate transmission to a user equipment (UE), after a switching interval following transmission of the SSB, of one or both of a downlink data signal or a downlink control signal that are associated with a second downlink bandwidth amount that is less than the first downlink bandwidth amount.

In a seventieth aspect alternatively or in addition to the sixty-ninth aspect, the apparatus is configured to transmit the downlink control signal via a physical downlink control channel (PDCCH).

In a seventy-first aspect alternatively or in addition to one or more of the sixty-ninth through seventieth aspects, the apparatus is configured to transmit the downlink data signal via a physical downlink shared channel (PDSCH).

In a seventy-second aspect alternatively or in addition to one or more of the sixty-ninth through seventy-first aspects, the first downlink bandwidth amount corresponds to five megahertz (MHz).

In a seventy-third aspect alternatively or in addition to one or more of the sixty-ninth through seventy-second aspects, the second downlink bandwidth amount corresponds to one physical resource block (PRB).

In a seventy-fourth aspect alternatively or in addition to one or more of the sixty-ninth through seventy-third aspects, the second downlink bandwidth amount corresponds to six physical resource blocks (PRBs).

In a seventy-fifth aspect alternatively or in addition to one or more of the sixty-ninth through seventy-fourth aspects, the one or more processors execute the instructions to further configure the second downlink bandwidth amount.

In a seventy-sixth aspect alternatively or in addition to one or more of the sixty-ninth through seventy-fifth aspects, the apparatus includes a receiver and a transmitter configured to transmit the SSB, the downlink data signal, and the downlink control signal.

In a seventy-seventh aspect alternatively or in addition to one or more of the sixty-ninth through seventy-sixth aspects, the apparatus is configured as a base station.

In a seventy-seventh aspect, an apparatus includes means for performing the method of any of the first through thirty-fourth aspects. In some examples, the means may include one or more of the controller/processor 280, the memory 282, antennas 252a-r, the modulator/demodulators 254a-r, the MIMO detector 256, the receive processor 258, the transmit processor 264, the TX MIMO processor 266, the transceiver 462, the transmitter 464, the receiver 466, or the wireless radios 1401a-r. In some other examples, the means may include one or more of the controller/processor 240, the memory 242, the antennas 234a-t, the modulator/demodulators 232a-t, the MIMO detector 236, the receive processor 238, the transmit processor 220, the TX MIMO processor 230, the transceiver 402, the transmitter 404, the receiver 406, or the wireless radios 1501a-t.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and devices described herein (e.g., one or more components, functional blocks, and devices of FIG. 2) may include one or more processors, electronics devices, hardware devices, electronics components, logical circuits, memories, software codes, firmware codes, etc., or any combination thereof. Those of skill would further appreciate that the various illustrative logical blocks, devices, circuits, and operations (e.g., one or more operations of FIGS. 8-13) described herein may be implemented using electronic hardware, computer software, or combinations of both. To illustrate, various components, blocks, devices, circuits, and steps have been described above generally in terms of their functionality. Whether such functionality is implemented as hardware or software depends upon the particular application and design parameters of the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for wireless communication comprising:
a memory comprising instructions; and
one or more processors configured to execute the instructions to:
control reception of a synchronization signal block (SSB) by using a first downlink bandwidth amount;
during a switching interval following the reception of the SSB, adjust from operation based on the first downlink bandwidth amount to operation based on a second downlink bandwidth amount that is less than the first downlink bandwidth amount, the switching interval including one or more time slots reserved for the adjustment; and
after the switching interval, control reception at least one of a downlink data signal or a downlink control signal, wherein the downlink data signal and the downlink control signal are associated with the second downlink bandwidth amount.

2. The apparatus of claim 1, wherein the downlink control signal is obtained via a physical downlink control channel (PDCCH).

3. The apparatus of claim 1, wherein the downlink data signal is obtained via a physical downlink shared channel (PDSCH).

4. The apparatus of claim 1, wherein the first downlink bandwidth amount corresponds to five megahertz (MHz).

5. The apparatus of claim 1, wherein the second downlink bandwidth amount corresponds to one physical resource block (PRB).

6. The apparatus of claim 1, wherein the second downlink bandwidth amount corresponds to six physical resource blocks (PRBs).

7. The apparatus of claim 1, further comprising obtaining a configuration of the second downlink bandwidth amount.

8. The apparatus of claim 1, further comprising a transceiver configured to receive the SSB, the downlink data signal, and the downlink control signal, wherein the apparatus is configured as a user equipment (UE).

9. An apparatus for wireless communication comprising:
a memory comprising instructions; and
one or more processors configured to execute the instructions to:
initiate transmission of a synchronization signal block (SSB) by using a first downlink bandwidth amount; and
after a switching interval following the transmission of the SSB, initiate transmission of at least one of a downlink data signal or a downlink control signal, wherein the downlink data signal and the downlink control signal are associated with a second downlink bandwidth amount that is less than the first downlink bandwidth amount, the switching interval including one or more time slots reserved for adjustment from the first downlink bandwidth to the second downlink bandwidth.

10. The apparatus of claim 9, wherein the downlink control signal is transmitted via a physical downlink control channel (PDCCH).

11. The apparatus of claim 9, wherein the downlink data signal is transmitted via a physical downlink shared channel (PDSCH).

12. The apparatus of claim 9, wherein the first downlink bandwidth amount corresponds to five megahertz (MHz).

13. The apparatus of claim 9, wherein the second downlink bandwidth amount corresponds to one physical resource block (PRB).

14. The apparatus of claim 9, wherein the second downlink bandwidth amount corresponds to six physical resource blocks (PRBs).

15. The apparatus of claim 9, wherein the one or more processors execute the instructions to further configure the second downlink bandwidth amount.

16. The apparatus of claim 9, further comprising a transceiver configured to transmit the SSB, the downlink data signal, and the downlink control signal, wherein the apparatus is configured as a network node.

17. A method of wireless communication at a user equipment (UE), the method comprising:
   obtaining a synchronization signal block (SSB) from a network node using a first downlink bandwidth amount;
   during a switching interval following the reception of the SSB, adjusting from operation based on the first downlink bandwidth amount to operation based on a second downlink bandwidth amount that is less than the first downlink bandwidth amount, the switching interval including one or more time slots reserved for adjustment from the first downlink bandwidth to the second downlink bandwidth; and
   after the switching interval, receiving at least one of a downlink data signal or a downlink control signal from the network node, wherein the downlink data signal and the downlink control signal are associated with the second downlink bandwidth amount.

18. The method of claim 17, further comprising:
   obtaining one or more configuration messages indicating a downlink duty cycle associated with one or more downlink signals including one or more of the SSB, the downlink data signal, or the downlink control signal; and
   obtaining the one or more downlink signals in accordance with the downlink duty cycle.

19. The method of claim 18, wherein the one or more configuration messages further indicate an uplink duty cycle, and further comprising outputting an uplink signal in accordance with the uplink duty cycle.

20. The method of claim 19, wherein the uplink duty cycle and the downlink duty cycle are selected to enable a common data rate for the uplink signal and the one or more downlink signals.

* * * * *